United States Patent
Hayashi et al.

(10) Patent No.: US 10,618,836 B2
(45) Date of Patent: Apr. 14, 2020

(54) GLASS PLATE AND MANUFACTURING METHOD THEREOF

(71) Applicant: AGC Glass Europe, Louvain-la-Neuve (BE)

(72) Inventors: Hideaki Hayashi, Chiyoda-ku (JP); Bernard Monville, Chiyoda-ku (JP); Koji Ushikubo, Chiyoda-ku (JP); Eric Tixhon, Louvain-la-Neuve (BE); Gaetan Di Stefano, Louvain-la-Neuve (BE); Alain Schutz, Louvain-la-Neuve (BE)

(73) Assignee: AGC Glass Europe, Louvain-La-Neuve (BE)

( * ) Notice: Subject to any disclaimer, the term of this patent is extended or adjusted under 35 U.S.C. 154(b) by 109 days.

(21) Appl. No.: 15/713,058

(22) Filed: Sep. 22, 2017

(65) Prior Publication Data

US 2018/0009703 A1 Jan. 11, 2018

Related U.S. Application Data

(63) Continuation of application No. PCT/JP2016/057425, filed on Mar. 9, 2016.

(30) Foreign Application Priority Data

Apr. 10, 2015 (JP) .................................. 2015-081226

(51) Int. Cl.
*C03C 17/245* (2006.01)
*F25D 23/02* (2006.01)
(Continued)

(52) U.S. Cl.
CPC ...... *C03C 17/2453* (2013.01); *C03C 17/3417* (2013.01); *F25D 23/028* (2013.01);
(Continued)

(58) Field of Classification Search
USPC ........ 428/426, 428, 432, 434, 688, 701, 702
See application file for complete search history.

(56) References Cited

U.S. PATENT DOCUMENTS 4,507,547 A 3/1985 Taga et al.
7,597,938 B2 * 10/2009 Thomsen ............ C03C 17/3417
427/165
(Continued)

FOREIGN PATENT DOCUMENTS

EP 1 293 726 A2 3/2003
EP 2 803 646 A1 11/2014
(Continued)

OTHER PUBLICATIONS

International Search Report dated May 24, 2016 in PCT/JP2016/057425, filed on Mar. 9, 2016 (with English Translation).
(Continued)

*Primary Examiner* — Lauren R Colgan
(74) *Attorney, Agent, or Firm* — Oblon, McClelland, Maier & Neustadt, L.L.P.

(57) ABSTRACT

A glass plate includes a first surface provided with a first film; and a second surface provided with a second film and opposite to the first surface. Each of the first film and the second film includes mainly tin oxide and has a sheet resistance value of 20 Ω/□ or less. When film thicknesses of the first and second films are $\theta_1$ nm and $\theta_2$ nm respectively, and when, in the glass plate, a haze value measured from the first surface side for a configuration provided with the first film only is $H_1$ (%), and a haze value measured from the second surface side for a configuration provided with the second film only is $H_2$ (%), a value of $\theta_1$ divided by $H_1$ is 500 or more but 1200 or less, and a value of $\theta_2$ divided by $H_2$ is 300 or more but 750 or less.

20 Claims, 1 Drawing Sheet

(51) Int. Cl.
*C03C 17/34* (2006.01)
*H05B 3/68* (2006.01)
*H05B 3/74* (2006.01)
*F24C 15/04* (2006.01)

(52) U.S. Cl.
CPC ............... *H05B 3/688* (2013.01); *H05B 3/74* (2013.01); *C03C 2217/211* (2013.01); *C03C 2217/241* (2013.01); *C03C 2217/94* (2013.01); *C03C 2217/948* (2013.01); *C03C 2218/152* (2013.01); *C03C 2218/36* (2013.01); *C03C 2218/365* (2013.01); *F24C 15/04* (2013.01); *H05B 2203/017* (2013.01)

(56) References Cited

U.S. PATENT DOCUMENTS

| | | | | |
|---|---|---|---|---|
| 8,097,342 | B2* | 1/2012 | Thomsen | C03C 17/3602 126/19 R |
| 8,980,386 | B2* | 3/2015 | Lemmer | E06B 3/6715 428/34 |
| 9,332,862 | B2* | 5/2016 | Nunez-Regueiro | C03C 3/087 |
| 9,416,582 | B2* | 8/2016 | Pesce | C03C 17/245 |
| 2003/0113550 | A1* | 6/2003 | Millett | A47F 3/0434 428/432 |
| 2004/0214010 | A1* | 10/2004 | Murata | A47F 3/0434 428/426 |
| 2007/0122580 | A1 | 5/2007 | Krall, Jr. et al. | |
| 2009/0011206 | A1* | 1/2009 | Schutz | C03C 17/3417 428/216 |
| 2011/0212311 | A1* | 9/2011 | Lemmer | C03C 17/3417 428/212 |
| 2012/0244298 | A1 | 9/2012 | Huffer et al. | |
| 2014/0154434 | A1* | 6/2014 | Nunez-Regueiro | C03C 3/087 428/34 |

FOREIGN PATENT DOCUMENTS

| | | |
|---|---|---|
| JP | 58-209549 | 12/1983 |
| JP | 60-60946 | 4/1985 |
| JP | 62-191446 | 8/1987 |
| JP | 2001-114534 | 4/2001 |
| JP | 2002-128542 | 5/2002 |
| JP | 2002-327927 | 11/2002 |
| JP | 2005-289802 | 10/2005 |
| JP | 2008-94647 | 4/2008 |
| JP | 2009-515811 | 4/2009 |
| JP | 2014-73642 A | 4/2014 |
| JP | 2014-508712 | 4/2014 |
| WO | WO 01/28949 A1 | 4/2001 |
| WO | WO 2006/117345 A1 | 11/2006 |
| WO | WO 2013/118897 A1 | 8/2013 |
| WO | WO 2014/112482 A1 | 7/2014 |

OTHER PUBLICATIONS

Written Opinion dated May 24, 2016 in PCT/JP2016/057425, filed on Mar. 9, 2016.

* cited by examiner

GLASS PLATE AND MANUFACTURING METHOD THEREOF

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/057425 filed on Mar. 9, 2016 and designating the U.S., which claims priority of Japanese Patent Application No. 2015-081226 filed on Apr. 10, 2015. The entire contents of the foregoing applications are incorporated herein by reference.

BACKGROUND OF THE INVENTION

1. Field of the Invention

The disclosure herein generally relates to a glass plate and a manufacturing method thereof.

2. Description of the Related Art

In some cases a Low-E glass (low-emissivity glass) is used as a useful glass in a location where a temperature difference from an environment is great, such as windows of a building, electrical equipment, and a vehicle.

Low-E glass is a glass in which a film that suppresses a heat transfer by radiation, known as a Low-E film, is arranged on at least one surface of a glass plate. In the Low-E glass, according to the effect of the Low-E film, more excellent heat insulating property/heat-shielding property can be obtained than the typical glass plate.

At present, such a Low-E film is deposited by various methods, such as a sputtering method, a CVD method, or a spray method.

European Patent Application Publication No. 1293726 discloses depositing a first Low-E film, by a CVD method, on a first surface of a glass substrate, and depositing a second Low-E film, by a sputtering method, on a second surface of the glass substrate.

SUMMARY OF THE INVENTION

Technical Problem

However, in the glass member described in European Patent Application Publication No. 1293726, types and methods of depositing the Low-E films on the first surface and the second surface are different from each other, and materials and film qualities of the Low-E films on both sides are different from each other. Therefore, when the glass substrate is strengthened by a heat treatment, a warpage of the substrate may occur.

Moreover, on the first surface of the glass substrate, by a CVD method, a first Low-E film may be deposited, and on the second surface of the glass substrate, by a spray method, a second Low-E film may be deposited.

However, also in this manufacturing method, similarly to European Patent Application Publication No. 1293726, film qualities of the Low-E films formed on both sides of the glass substrate are different from each other. Therefore, even if the materials of the Low-E films formed on both sides are made samely, a sheet resistance value on the second Low-E film side formed by a spray method tends to become significantly high. When the Low-E film having such a high sheet resistance value is applied to a Low-E glass system, it is impossible to obtain sufficient temperature reduction effect on the front side and rear side, and sufficient heat insulating performance/heat-shielding performance may not be exerted.

The present invention was made in view of such a background, and it is an object of the present invention to provide a glass plate, in which a warpage is not liable to occur when a heat treatment is performed, and which has an appropriate sheet resistance value, and a manufacturing method thereof.

Solution to Problem

According to a first aspect of the present invention, a glass plate including a first surface provided with a first film; and a second surface provided with a second film and opposite to the first surface, each of the first film and the second film including mainly tin oxide and having a sheet resistance value of 20 Ω/□ or less, when a film thickness of the first film is $\theta_1$ nm, and a film thickness of the second film is $\theta_2$ nm, and when, in the glass plate, a haze value measured from the first surface side for a configuration provided with the first film only is $H_1$ (%), and a haze value measured from the second surface side for a configuration provided with the second film only is $H_2$ (%), a value of $\theta_1$ divided by $H_1$ ($\theta_1/H_1$) being 500 or more but 1200 or less, and a value of $\theta_2$ divided by $H_2$ ($\theta_2/H_2$) being 300 or more but 750 or less, is provided.

According to a second aspect of the present invention, a manufacturing method of a glass plate in which films are provided on first and second surfaces that are opposite to each other, respectively, including (i) forming, during manufacturing of a glass ribbon, a first film mainly including tin oxide, by a CVD method, on the first surface of the glass ribbon that is an opposite side to the second surface, the second surface contacting melted tin; and (ii) forming, after cutting the glass ribbon, on the second surface, by a CVD method, a second film mainly including tin oxide, when a film thickness of the first film in $\theta_1$ nm, and a film thickness of the second film is $\theta_2$ nm, and when, in the glass plate obtained after the step (ii), a haze value measured from the first surface side for a configuration provided with the first film only is $H_1$ (%), and a haze value measured from the second surface side for a configuration provided with the second film only is $H_2$ (%), a value of $\theta_1$ divided by $H_1$ ($\theta_1/H_1$) being 500 or more but 1200 or less, and a value of $\theta_2$ divided by $H_2$ ($\theta_2/H_2$) being 300 or more but 750 or less, is provided.

Effect of the Invention

According to the present invention, a glass plate in which a warpage of a glass substrate is not liable to occur and which has an appropriate sheet resistance value, when a heat treatment is performed, and a manufacturing method thereof can be provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

In the following, with reference to drawings, embodiments of the present invention will be described.

(Glass Plate According to an Embodiment of the Present Invention)

Figure 1:
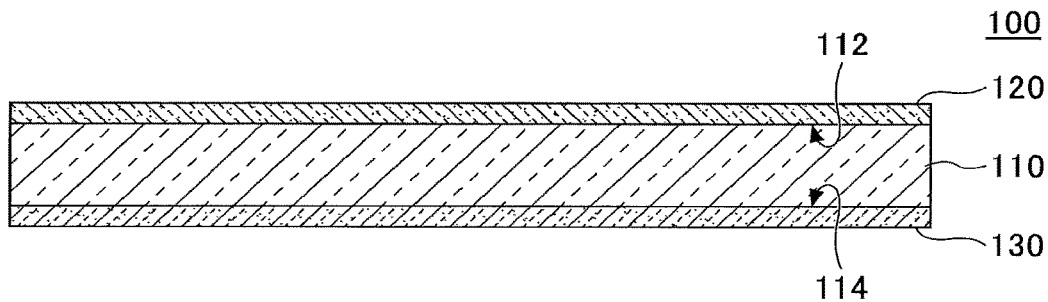
FIG. 1 is a cross sectional diagram schematically depicting an example of a glass plate according to an embodiment.

FIG. 1 schematically depicts a cross-section of a glass plate according to an embodiment of the present invention (in the following, referred to as the "first glass plate").

As illustrated in FIG. 1, the first glass plate 100 is configured by arranging films on respective surfaces of a glass substrate 110. More specifically, the glass substrate 110 includes a first surface 112 and a second surface 114. A first film 120 is arranged on the first surface 112 of the glass substrate 110, and a second film 130 is arranged on the second surface 114 of the glass substrate 110.

The first film 120 is configured by a material mainly including tin oxide. Similarly, the second film 130 is configured by a material mainly including tin oxide. An undercoat layer may be arranged between the first film and the glass substrate 110. Similarly, an undercoat layer may be arranged between the second film and the glass substrate 110. These undercoat layers have a role of preventing constituent elements from diffusing to each other, between the first film 120 and the glass substrate 110 and between the second film 130 and the glass substrate 110. Moreover, the undercoat layers prevent light from being reflected from the glass substrate 110 via the first film 120 or the second film 130.

In the present application, "(layer) mainly including a material 'A'" means that at least 50 wt % of the material 'A' is included in the layer.

In the first glass plate 100, the first film 120 has a sheet resistance value of 20 Ω/□ or less. Similarly, the second film 130 has a sheet resistance value of 20 Ω/□ or less.

In the first glass plate 100, for a configuration provided with the first film 120 only, a haze value measured from the first surface side is $H_1$ (%), and for a configuration provided with the second film 130 only, a haze value measured from the second surface side is $H_2$ (%), a first film 120 is configured so that a value obtained by dividing $\theta_1$ by $H_1$ ($\theta_1/H_1$) is within a range from 500 to 1200. Moreover, the second film 130 is configured so that a value obtained by dividing $\theta_2$ by $H_2$ ($\theta_2/H_2$) is within a range from 300 to 750.

Here, $\theta_1$ is a film thickness (nm) of the first film, and $\theta_2$ is a film thickness (nm) of the second film.

The first film 120 having the above-described feature can be formed by an on-line CVD method under a predetermined condition. Moreover, the second film 130 having the above-described feature can be formed by an offline CVD method under a predetermined condition.

Moreover, as described above, any of the first film 120 and the second film 130 mainly includes tin oxide.

Therefore, when a relation between the film thickness and the haze value that satisfies the above-described condition is selected, a difference between the materials and the film qualities of the first film 120 and the second film 130 arranged on both surfaces 112 and 114 of the glass substrate 110 can be reduced.

According to the above-described features, the conventional problem can be significantly reduced whereby in the first glass plate 100, when a heat treatment is performed in order to strengthen the glass plate, a warpage of the glass substrate occurs.

Moreover, in the first glass plate 100, as described above, the first film 120 and the second film 130 are adjusted so that the sheet resistance values are 20 Ω/□ or less, respectively. Furthermore, it is known that there is a proportional relation between the sheet resistance value and an emissivity.

Therefore, by using the first glass plate 100, it becomes possible to significantly reduce or solve the conventional problem that when a glass plate is applied to a Low-E glass system, sufficient temperature reduction effect on the front side and rear side cannot be obtained, and sufficient heat insulating performance/heat-shielding performance may not be exerted.

The emissivity of the first glass plate 100 is preferably 0.25 or less, when the emissivity is measured from any one of the first surface and the second surface. It is more preferably 0.20 or less, further preferably 0.17 or less, and the most preferably 0.15 or less.

A transmittance of the first glass plate 100 is preferably 70% or more, when the transmittance is measured from any one of the first surface and the second surface. When the transmittance is less than 70%, visibility from inside of the glass to outside or from outside to inside is likely to be difficult to be obtained. The transmittance is more preferably 72% or more, further preferably 75% or more.

(Each Configuration Member of the Glass Plate)

Next, with the above-described configuration of the first glass plate 100 illustrated in FIG. 1, as an example, each configuration member included in the glass plate according to the embodiment of the present invention will be described in detail. In the following, upon indicating each member, the reference numerals illustrated in FIG. 1 will be used for the clarification of the description.

(Glass Substrate 110)

A material of the glass substrate 110 is not particularly limited as long as the material is a glass. The glass substrata 110 may be configured by, for example, a soda lime glass, a borosilicate glass, an alkali-alumino-silicate glass, or an alkali free glass.

The glass substrate 110 may be in a state where a strength has been improved by a heat treatment. Such heat treatment (referred to as a post heat treatment) will be described later.

(First Film 120)

The first film is configured by a material mainly including tin oxide. In the first film, a dopant such as fluorine and/or antimony may be doped. By the doping of the dopant to tin oxide, the first film may have a carrier concentration within a range from $1 \times 10^{20}$ to $1 \times 10^{22}$ cm$^{-1}$ measured by a Hall effect measurement apparatus, for example.

When an undercoat layer is further present between the first film 120 and the glass substrate 110, the undercoat layer is configured by an insulation layer such as a silicon oxide layer and/or a titanium oxide layer.

By arranging the undercoat layer between the first film and the glass substrate 110, an adhesiveness of the first film is improved. A total thickness of the undercoat layer is, for example, within a range from 10 nm to 70 nm.

The first film 120 has a sheet resistance value of 20 Ω/□ or less. The sheet resistance value is preferably 17 Ω/□ or less, and more preferably 15 Ω/□ or less. Even when a non-electrically insulated undercoat layer is present between the first film 120 and the glass substrate 110, the sheet resistance value tends to be a value of the entire first film 120. For the case of the first film 120 being configured only by the first film, or for the case of the first film 120 and an insulated undercoat layer being present, the sheet resistance value tends to be the same as the sheet resistance value of the first film.

As described above, when a thickness of the first film 120 is $\theta_1$ (nm), for a configuration provided with the first film only, and a haze value measured from the first surface side is $H_1$ (%), a $\theta_1/H_1$ value satisfies a range from 500 to 1200.

Especially, the thickness of the first film 120 $\theta_1$ is, for example, within a range from 300 nm to 550 nm, and preferably within a range from 420 nm to 490 nm. Moreover, the haze value $H_1$ is within a range from 0.2% to 1.0%, and preferably within a range from 0.4% to 0.8%.

The first film 120 is arranged by an on-line CVD method on a first surface 112 of the glass substrate 110. A temperature of the glass substrate 110 immediately before deposition is, for example, within a range from 550° C. to 1000° C. By the on-line CVD method, the first film 120 having the above-described sheet resistance value and the $\theta_1/H_1$ value can be formed relatively easily.

(Second Film 130)

The second film is configured by a material mainly including tin oxide. In the second film, a dopant such as fluorine and/or antimony may be doped. By the doping of the dopant to tin oxide, the second film may have a carrier concentration within a range from $1\times10^{20}$ to $1\times10^{22}$ cm$^{-1}$ measured by the Hall effect measurement apparatus, for example.

When an undercoat layer is present between the second film 130 and the glass substrate 110, the undercoat layer is configured by an insulation layer such as a silicon oxide layer and/or a titanium oxide layer.

By arranging the undercoat layer between the second film and the glass substrate 110, an adhesiveness of the second film is improved. A total thickness of the undercoat layer is, for example, within a range from 10 nm to 70 nm.

The second film 130 has a sheet resistance value of 20 Ω/□ or less. The sheet resistance value is preferably 17 Ω/□ or less, and more preferably 15 Ω/□ or less.

As described above, when a thickness of the second film 130 is $\theta_2$ (nm), for a configuration provided with the second film only, and a haze value measured from the second surface side is $H_2$ (%), a $\theta_2/H_2$ value satisfies a range from 300 to 750.

Especially, the thickness of the second film 130 $\theta_2$ is, for example, within a range from 250 nm to 550 nm, and preferably within a range from 310 nm to 490 nm. Moreover, the haze value $H_2$ is within a range from 0.2% to 1.5%, and preferably within a range from 0.4% to 1.0%.

The second film 130 is arranged by an offline CVD method on the second surface 114 of the glass substrate 110. A temperature of the glass substrate 110 immediately before deposition is, for example, within a range from 500° C. to 650° C. By the offline CVD method, the second film 130 having the above-described sheet resistance value and the $\theta_2/H_2$ value can be formed relatively easily.

The first film 120 formed on-line can be easily distinguished from the second film 130 formed offline. That is, the second surface 114 of the glass substrate 110 becomes a surface contacting a melted tin bath during depositing the first film 120 on-line. Then, at an interface between the second film 130 and the second surface 114 of the glass substrate 110, residual tin is introduced. Therefore, by the presence or absence of the residual tin, the first film 120 formed on-line and the second film 130 formed offline can be distinguished.

(First Glass Plate 100)

The first glass plate 100 can be applied to various low emissivity glass systems which require heat insulating property/heat-shielding property. Such a low emissivity glass system includes, for example, windows of buildings and vehicles, doors of ovens (including microwaves), windows of fireplaces, or reach-in doors of refrigerators.

Typically, such a low emissivity glass system includes a glass plate group configured by 2 sheets, or 3 or more sheets of glass plates. The first glass plate 100 is arranged at any part of such a glass plates group (e.g. an approximately central side, an approximately inner side, or the like).

(Manufacturing Method of a Glass Plate According to the Embodiment of the Present Invention)

Next, with reference to FIG. 2, an example of a manufacturing method of a glass plate according to the embodiment of the present invention will be described. With the first glass plate 100 illustrated in FIG. 1, as an example, a manufacturing method thereof will be described.

Figure 2:
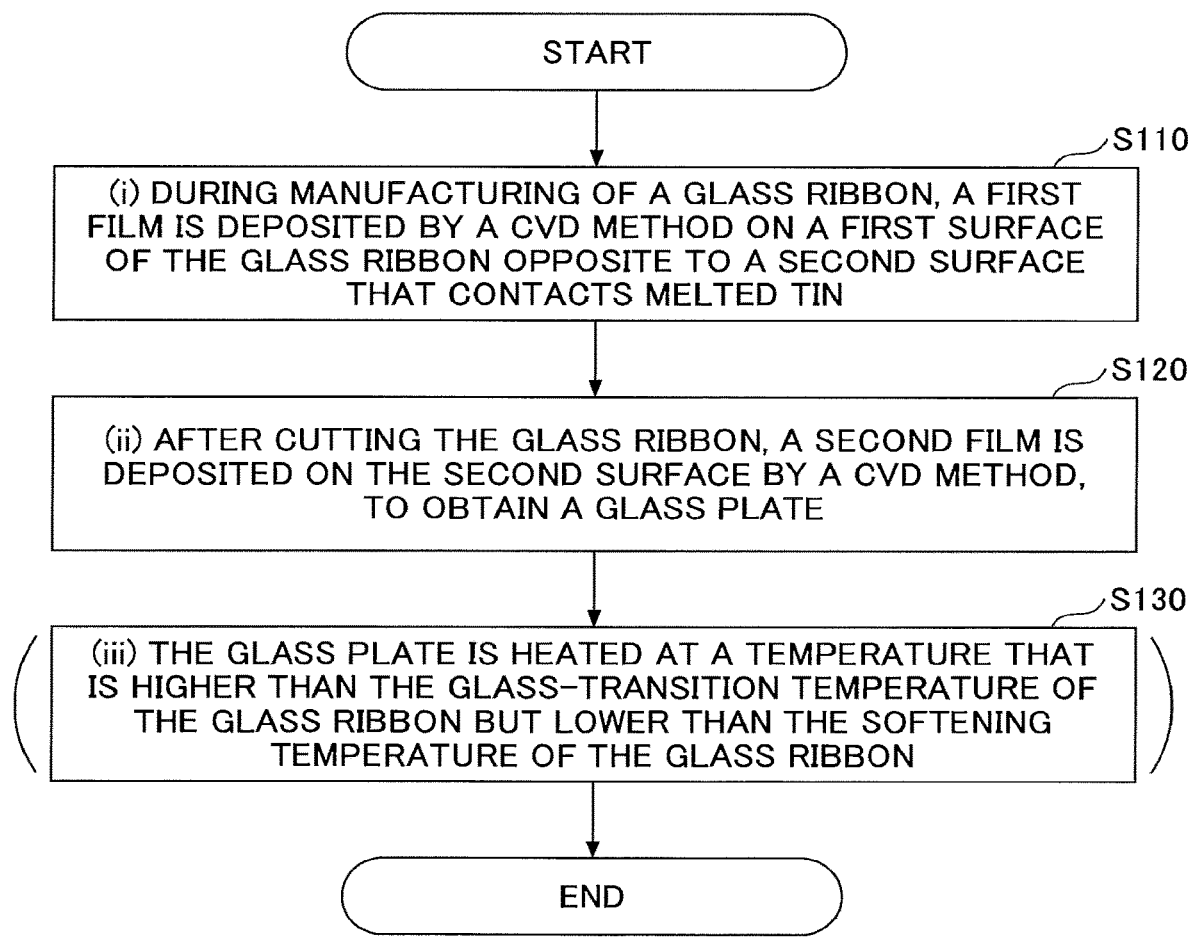
FIG. 2 is a flowchart schematically depicting a manufacturing method of a glass plate according to the embodiment.

FIG. 2 schematically depicts a flowchart of the manufacturing method of the glass plate according to the embodiment of the present invention (In the following referred to as the "first manufacturing method of glass plate").

As illustrated in FIG. 2, the first manufacturing method of glass plate includes:

(i) a step of, during manufacturing of a glass ribbon, depositing a first film by a CVD method on a first surface of the glass ribbon opposite to a second surface that contacts melted tin (step S110);

(ii) a step of depositing a second film, after cutting the glass ribbon, on the second surface by a CVD method, to obtain a glass plate (step S120); and (iii) a step of heating the glass plate at a temperature that is higher than the glass-transition temperature of the glass ribbon but lower than the softening temperature of the glass ribbon (step (S130).

The step S130 is performed optionally, and may be omitted.

In the following, the respective steps will be described. In the following explanations, upon indicating each member, the reference numerals illustrated in FIG. 1 will be used for the clarification of the description.

(Step S110)

First, by a general floating method, a glass ribbon is manufactured on a melted tin. The glass ribbon has a first surface and a second surface. The second surface is assumed to be a surface of the glass ribbon that contacts the melted tin (i.e. a lower surface). A composition of the glass ribbon is not particularly limited. The glass ribbon may have a composition for a soda lime glass, a borosilicate glass, an alkali alumino silicate glass, or an alkali free glass.

Next, in the middle of manufacturing of the glass ribbon, on the first surface (i.e. an upper surface), by a CVD method, a first film 120 is deposited (On-line CVD deposition).

A temperature of a deposition part of the glass ribbon is, for example, within a range from 550° C. to 1000° C. A conveyance speed of the glass ribbon is, for example, within a range from 1 m/minute to 30 m/minute. Moreover, a speed of supplying materials upon depositing is, for example, within a range from 100 g/minute to 2000 g/minute.

The first film 120 consists of a material mainly including tin oxide. The first film may be, for example, a tin oxide in which fluorine and/or antimony are doped.

As described above, an undercoat layer may be present between the first film 120 and the glass substrate 110. In this case, first, on the first surface of the glass ribbon, on undercoat layer or two or more undercoat layers are deposited. Thereafter, on the undercoat layer, the first film is deposited. The undercoat layer may include, for example, a silicon oxide layer and/or a titanium oxide layer.

A thickness of all the undercoat layers is, for example, within a range from 10 nm to 70 nm, and preferably within a range from 20 nm to 50 nm. A film thickness of the first film is, for example, within a range from 300 nm to 550 nm, and preferably within a range from 420 nm to 490 nm.

In the on-line CVD deposition under the above-described condition, when the thickness of each layer configuring the first film 120 is included in this range, the sheet resistance value of the first film 120 is 20 Ω/□ or less.

Moreover, in the on-line CVD deposition under the above-described condition, the $\theta_1/H_1$ value of the first film 120 is typically within a range from 500 to 1200.

Afterwards, the glass ribbon is cooled to room temperature, and the manufacture of the glass ribbon ends. The manufactured glass ribbon is cut into pieces with a predetermined size. According to the above-described operation, the glass substrate 110 having the first film 120 on the first surface 112 is obtained.

(Step S120)

Next, on the second surface 114 of the glass substrate 110 obtained as above, i.e. on the surface that contacted the melted tin bath upon manufacturing the glass ribbon, by a CVD method, a second film 130 is deposited (Offline CVD deposition).

A temperature of the glass substrate 110 upon deposition is, for example, within a range from 500° C. to 650° C. A speed of supplying materials upon depositing is, for example, within a range from 30 g/minute to 1000 g/minute. In the offline CVD deposition, different from the on-line CVD deposition, it is not necessarily required to perform the deposition in a state where the glass substrate 110 is conveyed. For example, the second film 130 may be deposited by a CVD method in a state where the glass substrate 110 remains at rest. In the case of depositing in the state where the glass substrate 110 is conveyed, the conveyance speed of the glass substrate 110 is, for example, within a range from 0.5 m/minute to 15 m/minute.

The second film 130 is configured by a material mainly including tin oxide. The second film may be, for example, a tin oxide in which fluorine and/or antimony are doped. The second film may have the same composition as the first film.

As described above, an undercoat layer may be present between the second film 130 and the glass substrate 110. In this case, first, on the second surface of the glass substrate 110, one undercoat layer or two or more undercoat layers are deposited. Thereafter, on the undercoat layer, the second film is deposited. The undercoat layer may include, for example, a silicon oxide layer and/or a titanium oxide layer.

A thickness of all the undercoat layers is, for example, within a range from 10 nm to 70 nm, and preferably within a range from 20 nm to 50 nm. A film thickness of the second film is, for example, within a range from 250 nm to 550 nm, and preferably within a range from 310 nm to 490 nm.

In the offline CVD deposition method under the above-described condition, when the thickness of each layer configuring the second film 130 is included in this range, the sheet resistance value of the second film 130 is 20 Ω/□ or less.

Moreover, in the offline CVD deposition under the above-described condition, the $\theta_2/H_2$ value of the second film 130 is typically within a range from 300 to 750.

(Step S130)

According to the processes of Steps S110 to S120, the glass plate 100 as illustrated in FIG. 1 can be manufactured.

Furthermore, the glass plate 100 obtained as above may be subjected to a post heat treatment. The post heat treatment is performed in order to enhance the strength of the glass substrate 110. By performing the post heat treatment, a compressive stress layer is formed on a surface of glass, and a tensile stress layer is formed inside the glass. By forming the above-described stress distribution, the strength of the glass substrate 110 is enhanced, and when the glass plate 100 is broken, sharp pieces can be prevented from scattering.

The post heat treatment is performed, for example, by heating the glass plate 100 up to a predetermined temperature in open air, and then, rapidly cooling the glass plate 100.

The heating temperature is selected from temperatures higher than the glass-transition temperature and lower than the softening temperature. The heating temperature may be, for example, within a range from 600° C. to 720° C. A heating time is, in a typical case, about 10 seconds to 5 minutes. A cooling method is not particularly limited. A cooling process may be performed, for example, by exposing the heated glass substrate 110 directly into the room temperature environment. Alternatively, the cooling process may be performed by blowing compressed air onto both surfaces of the heated glass substrate 110.

According to the above-described processes, the glass plate 110 according to the embodiment of the present invention can be manufactured.

EXAMPLES

Next, examples of the present invention will be described.

Example 1

According to the following method, a glass plate having the Low-E films on both surfaces was manufactured.

First, during manufacturing of a soda lime glass by a floating method, on an upper surface (first surface) of a glass ribbon being conveyed, by an on-line CVD method, an undercoat (two layers) and a first film were deposited in this order.

As a first undercoat, a $TiO_2$ layer (targeted thickness is 10 nm) was deposited. For the raw material, a mixed gas of titanium tetraisopropoxide (TTIP) and nitrogen was used.

Next, as a second undercoat, a $SiO_2$ layer (targeted thickness is 30 nm) was deposited. For the raw material, a mixed gas of silane, oxygen, and nitrogen was used.

Then, as the first film, a fluorine-doped tin oxide layer (targeted thickness is 460 nm) was deposited. For the raw material, a mixed gas of monobutyltinchloride (MBTC), trifluoroacetic acid (TFA), oxygen, nitrogen, and water vapor was used. A speed of supplying MBTC of the raw material was set to be within a range from 300 g/minute to 1800 g/minute.

A surface temperature of the glass ribbon immediately before depositing each layer was within a range from 580° C. to 950° C., and a conveyance speed was within a range from 5 m/minute to 30 m/minute.

Afterwards, the glass ribbon was cooled to the room temperature, and then, the glass ribbon was cut into pieces having a predetermined dimension. According to the operations, a glass plate having the first film on one surface (first surface) was obtained.

For the obtained glass plate (in the following, also referred to as a "constituent 1"), using a haze meter, a measurement of a haze value for a D65 light source was performed. As a result, a haze value was 0.5%. Therefore, the above-described $\theta_1/H_1$ value was 460/0.5=920.

Next, on a surface of the glass plate that had contacted a melted tin bath (second surface), by an offline CVD method, an undercoat (two layers) and a second film were deposited in this order. Configurations of the undercoat and the second film were set to be the same as the first film.

The deposition of the second film was performed in a state where the second surface of the glass plate was in an upward direction, while conveying the glass plate. A surface temperature of the glass plate immediately before the deposition was 600° C., and the conveyance speed of the glass plate was within a range from 1 m/minute to 10 m/minute.

After depositing a $TiO_2$ layer (targeted thickness was 10 nm) and a $SiO_2$ layer (targeted thickness was 30 nm), a fluorine-doped tin oxide layer (targeted thickness was 460 nm) was deposited. For the raw material, a mixed gas of MTBC, hydrogen fluoride, oxygen, nitrogen, and water vapor was used. A speed of supplying MBTC of the raw material was set to be within a range from 30 g/minute to 500 g/minute.

According to the above-described operations, a glass plate having a first film on the first surface of the glass plate, and a second film on the second surface of the glass plate (in the following, referred to as a "glass plate 1") was manufactured.

In the obtained glass plate 1, the first film was removed, and a constituent (in the following, also referred to as a "constituent 2") was formed. Moreover, using the constituent 2, a haze value was measured. As a result, a haze value was 0.9%. Therefore, the $\theta_2/H_2$ value was 460/0.9=467.

Example 2

By the same method as the above-described example 1, a glass plate (in the following, referred to as a "glass plate 2") was manufactured.

In the example 2, for the conveyance speed of the glass plate upon depositing the second film (1 m/minute to 10 m/minute) and the speed of supplying MBTC of the raw material (20 g/minute to 400 g/minute), a condition different from the case of the example 1 was employed. The targeted thickness of a fluorine-doped tin oxide layer in the second film was set to 300 nm. Other manufacturing conditions were the same as the case of the example 1.

In the obtained glass plate 2, the first film was removed, and a constituent 2 was formed. Moreover, using the constituent 2, a haze value was measured. As a result, a haze value was 0.6%. Therefore, the above-described $\theta_2/H_2$ value was 300/0.6=500.

Example 3

By the same method as the above-described example 1, a glass plate (in the following, referred to as a "glass plate 3") was manufactured.

In the example 3, the temperature of the glass plate immediately before depositing the second film was set to 560° C. Moreover, for the conveyance speed of the glass plate upon depositing the second film (0.5 m/minute to 10 m/minute) and the speed of supplying MBTC of the raw material (30 g/minute to 500 g/minute), a condition different from the case of the example 1 was employed. The targeted thickness of a fluorine-doped tin oxide layer in the second film was set to 440 nm. Other manufacturing conditions were the same as the case of the example 1.

In the obtained glass plate 3, the first film was removed, and a constituent 2 was formed. Moreover, using the constituent 2, a haze value was measured. As a result, a haze value was 1.6%. Therefore, the $\theta_2/H_2$ value was 440/1.6=271.

Example 4

By the same method as the above-described example 3, a glass plate (in the following, referred to as a "glass plate 4") was manufactured.

In the example 4, for the conveyance speed of the glass plate upon depositing the second film (0.5 m/minute to 10 m/minute) and the speed of supplying MBTC of the raw material (20 g/minute to 400 g/minute), a condition different from the case of the example 1 was employed. The targeted thickness of a fluorine-doped tin oxide layer in the second film was set to 310 nm. Other manufacturing conditions were the same as the case of the example 3.

In the obtained glass plate 4, the first film was removed, and a constituent 2 was formed. Moreover, using the constituent 2, a haze value was measured. As a result, a haze value was 0.3%. Therefore, the $\theta_2/H_2$ value was 310/0.3=1033.

Example 5

By the same method as the above-described example 1, a glass plate (in the following, referred to as a "glass plate 5") was manufactured.

In the example 5, the second film was a single layer of the fluorine-doped tin oxide layer. That is, in the offline CVD deposition, a deposition process of an undercoat layer of two layers, as in the example 1, was not performed, but on the second surface of the glass plate, a fluorine-doped tin oxide layer was deposited directly. The targeted thickness of the fluorine-doped tin oxide layer was set to 418 nm.

In the obtained glass plate 5, the first film was removed, and a constituent 2 was formed. Moreover, using the constituent 2, a haze value was measured. As a result, a haze value was 0.5%. Therefore, the $\theta_2/H_2$ value was 410/0.5=820.

Example 6

By the same method as the above-described example 1, a glass plate (in the following, referred to as a "glass plate 6") was manufactured.

In the example 6, the second film was deposited by an offline sputtering method. Moreover, the second film was a single layer of an ITO layer. A deposition of the ITO layer was performed as follows:

First, in a state where the second surface of the glass plate was in an upward direction, the glass plate is arranged inside a deposition chamber. Then, the glass plate was heated to 185° C. in a rest state. In this state, the sputtering deposition of the ITO layer on the glass plate was performed. For the target of the sputtering, a sintered body configured by indium oxide and tin oxide was used. A film thickness of the ITO layer was targeted to 90 nm.

In the obtained glass plate 6, the first film was removed, and a constituent 2 was formed. Moreover, using the constituent 2, a haze value was measured. As a result, a haze value was 0.1%. Therefore, the above-described $\theta_2/H_2$ value was 90/0.1=900.

TABLE 1, in the following, shows a deposition method, a haze value, the above-described $\theta_1/H_1$ value and the $\theta_2/H_2$ value for the respective first film and the second film of the glass plates 1 to 6, as a whole.

TABLE 1

| example | first film configuration | deposition method | haze value $H_1$ (%) | $\theta_1/H_1$ | second film configuration | deposition method | haze value $H_2$ (%) | $\theta_2/H_2$ |
|---|---|---|---|---|---|---|---|---|
| 1 | F-doped $SnO_2$ (460 nm) | on-line cvd method | 0.5 | 920 | F-doped $SnO_2$ (420 nm) | offline cvd method | 0.9 | 467 |
| 2 | F-doped $SnO_2$ (460 nm) | on-line cvd method | 0.5 | 920 | F-doped $SnO_2$ (300 nm) | offline cvd method | 0.6 | 500 |
| 3 | F-doped $SnO_2$ (460 nm) | on-line cvd method | 0.5 | 920 | F-doped $SnO_2$ (440 nm) | offline cvd method | 1.6 | 271 |
| 4 | F-doped $SnO_2$ (460 nm) | on-line cvd method | 0.5 | 920 | F-doped $SnO_2$ (310 nm) | offline cvd method | 0.3 | 1033 |
| 5 | F-doped $SnO_2$ (460 nm) | on-line cvd method | 0.5 | 920 | F-doped $SnO_2$ (410 nm) | offline cvd method | 0.5 | 820 |
| 6 | F-doped $SnO_2$ (460 nm) | on-line cvd method | 0.5 | 920 | ITO (90 nm) | offline sputtering method | 0.1 | 900 |

(Evaluation)

Using the glass plates 1 to 6, the following evaluations were performed:

(Measurement of Sheet Resistance Value)

For the respective glass plates 1 to 6, using a four probe method, a sheet resistance value was measured. The measurement of sheet resistance values is performed by using the above-described constituent 1 (i.e. a state of the glass plate and the first film), and the constituent 2 (i.e. a state of the glass plate and the second film).

In the fields of "Sheet resistance value" in TABLE 2, as follows, results of measurement for the sheet resistance value obtained for the constituent 1 and the constituent 2 prepared from the glass plates 1 to 6 are shown as a whole.

TABLE 2

| | sheet resistance value ($\Omega/\square$) | | heat treatment | durability | transmittance |
|---|---|---|---|---|---|
| example | constituent 1 | constituent 2 | test | test | (%) |
| 1 | 10.3 | 14.9 | excellent | excellent | 76.5 |
| 2 | 10.3 | 19.2 | excellent | excellent | 77.3 |
| 3 | 10.3 | 14.1 | fair | excellent | 75.9 |
| 4 | 10.3 | 21.2 | fair | excellent | 78.0 |
| 5 | 10.3 | 17.1 | fair | excellent | 75.4 |
| 6 | 10.3 | 22.8 | fair | fair | 80.1 |

As shown in TABLE 2, the sheet resistance value of the constituent 1 was 10.3 W/☐ for any of the glass plates 1 to 6. The sheet resistance value of the constituent 2 greatly varied among the glass plates 1 to 6. It was found that the sheet resistance value of the constituent 2 was 20 W/☐ or less for the glass plates 1 to 3 and 5, and excellent electroconductivity was exhibited.

(Heat Treatment Test)

For the respective glass plates 1 to 6, a state of warpage upon performing the post heat treatment was evaluated.

The post heat treatment was performed with the following procedure.

First, the respective glass plates were arranged horizontally in an electric furnace that could be carried in and out by a belt conveyer. At this time, the respective glass plates were arranged on the belt conveyer so that the first film was in a downward direction. Next, the glass plates were heated at 700° C., and maintained for a sufficient time. Afterwards, the glass plates were carried out of the electric furnace at a conveyance speed of 70 mm/minute, and the glass plates were cooled.

The respective samples after the post heat treatment were arranged horizontally on a table, and a presence/absence of a warpage was evaluated. For the evaluation of warpage, "excellent (warpage is absent)" was determined when a warpage of the glass plate was 3 mm or less, and "fair (warpage is present)" was determined when the warpage of the glass plate was greater than 3 mm.

As a result, the glass plates 1 and 2 were determined as "warpage is absent". The glass plates 3 to 6 were determined as "warpage is present".

In the field of "heat treatment test" in above-described TABLE 2, results of the heat treatment test obtained for the glass plates 1 to 6 were shown as a whole.

(Durability Test)

For the respective glass plates 1 to 6, the durability test was performed.

For the durability test, the following four items were performed based on the standard EN 1096-2:2012:

(i) test at high temperature and high humidity for 21 days (heat cycle test within a temperature from 45° C. to 55° C. in an atmosphere of humidity greater than 98% RH);

(ii) neutral salt water spray test for 21 days (NaCl of concentration of 50 g/l was sprayed at an atmosphere temperature of 35° C.±2° C.);

(iii) SO2 Kesternich test (5 cycles of a heat cycle at temperature of 40° C.±3° C. for 8 hours and at a room temperature for 16 hours were performed in $SO_2$ of 0.2 liters.); and (iv) felt abrasion test of 500 cycles.

In the field of "durability test" in above-described TABLE 2, result of the durability test obtained for the glass plates 1 to 6 were shown as a whole.

In TABLE 2, when good results were obtained for all four of the items, determination was "excellent (durability)". Otherwise, determination was "fair".

From the results, it was found that the glass plates 1 to 5 exhibit an excellent durability, but the glass plate 6 does not exhibit a good durability.

(Measurement of Transmittance)

For the respective glass plates 1 to 6, using a haze meter, a total light transmittance for a D65 light source was measured.

In the field of "transmittance" in above-described TABLE 2, results of the measurement of transmittance obtained for the glass plates 1 to 6 were shown as a whole.

As results of the measurement, for any of the glass plates, the transmittance was 75% or more.

(Evaluation of Emissivity)

For the glass plates 1 and 2, an evaluation of whole hemisphere emissivity was performed using a emissivity meter.

As a result, it was found that the glass plates 1 and 2 exhibit sufficiently small emissivity of 0.25 or less.

INDUSTRIAL APPLICABILITY

The present invention can be applied, for example, to a glass plate for a Low-E glass system.

What is claimed is:

1. A glass plate comprising:
a first surface provided with a first film; and
a second surface provided with a second film and opposite to the first surface,
wherein each of the first film and the second film includes mainly tin oxide and has a sheet resistance value of 20 Ω/□ or less,
wherein a film thickness of the first film is $\theta_1$ nm, and a film thickness of the second film is $\theta_2$ nm, and, in the glass plate, a haze value measured from the first surface side for a configuration provided with the first film only is $H_1$ (%), and a haze value measured from the second surface side for a configuration provided with the second film only is $H_2$ (%),
a value of $\theta_1$ divided by $H_1$ ($\theta_1/H_1$) is 500 or more but 1200 or less, and
a value of $\theta_2$ divided by $H_2$ ($\theta_2/H_2$) is 300 or more but 750 or less.

2. The glass plate according to claim 1 further comprising at least one of:
a first insulated undercoat layer between the first film and the first surface; and
a second insulated undercoat layer between the second film and the second surface.

3. The glass plate according to claim 1,
wherein at least one of the first film and the second film is consisting of a fluorine-doped tin oxide.

4. The glass plate according to claim 1,
wherein the glass plate has a transmittance of 70% or more.

5. The glass plate according to claim 1,
wherein the glass plate has an emissivity of 0.25 or less.

6. The glass plate according to claim 1,
wherein the glass plate is applied to a door of an oven or a reach-in door of a refrigerator.

7. The glass plate according to claim 1,
wherein the film thickness $\theta_1$ of the first film is within a range from 300 nm to 550 nm, and,
wherein the film thickness $\theta_2$ of the second film is within a range from 250 nm to 550 nm.

8. The glass plate according to claim 1,
wherein the film thickness $\theta_1$ of the first film is within a range from 420 nm to 490 nm, and,
wherein the film thickness $\theta_2$ of the second film is within a range from 310 nm to 490 nm.

9. The glass plate according to claim 1,
wherein the haze value $H_1$ is within a range of 0.2% to 1.0%, and
wherein the haze value $H_2$ is within a range of 0.2% to 1.5%.

10. The glass plate according to claim 1,
wherein the haze value $H_1$ is within a range of 0.4% to 0.8%, and
wherein the haze value $H_2$ is within a range of 0.4% to 1.0%.

11. The glass plate according to claim 1,
wherein sheet resistance value is 15 Ω/□ or less.

12. The glass plate according to claim 1,
wherein the glass plate is a soda lime glass made by a float method and the second surface contacted a melted tin bath.

13. A glass plate comprising:
a first surface provided with a first film; and
a second surface provided with a second film and opposite to the first surface,
wherein each of the first film and the second film includes mainly tin oxide and has a sheet resistance value of 20 Ω/□ or less,
wherein a film thickness of the first film is $\theta_1$ nm, and a film thickness of the second film is $\theta_2$ nm, and in the glass plate, a haze value measured from the first surface side for a configuration provided with the first film only is $H_1$ (%), and a haze value measured from the second surface side for a configuration provided with the second film only is $H_2$ (%),
a value of $\theta_1$ divided by $H_1$ ($\theta_1/H_1$) is 500 or more but 1200 or less, and
a value of $\theta_2$ divided by $H_2$ ($\theta_2/H_2$) is 300 or more but 750 or less,
wherein the film thickness $\theta_1$ of the first film is within a range from 300 nm to 550 nm, and the film thickness $\theta_2$ of the second film is within a range from 250 nm to 550 nm,
wherein the haze value $H_1$ is within a range of 0.4% to 0.8% and the haze value $H_2$ is within a range of 0.4% to 1.0%, and
wherein the glass plate is a soda lime glass made by a float method and the second surface contacted a melted tin bath.

14. A manufacturing method of a glass plate in which films are provided on first and second surfaces that face each other, respectively, the method comprising:
(i) forming, during manufacturing of a glass ribbon, a first film mainly including tin oxide, by a CVD method, on the first surface of the glass ribbon that is an opposite side to the second surface, the second surface contacting melted tin; and
(ii) forming, after cutting the glass ribbon, on the second surface, by a CVD method, a second film mainly including tin oxide,
wherein a film thickness of the first film is $\theta_1$ nm, and a film thickness of the second film is $\theta_2$ nm, and, in the glass plate obtained after the step (ii), a haze value measured from the first surface side for a configuration provided with the first film only is $H_1$ (%), and a haze value measured from the second surface side for a configuration provided with the second film only is $H_2$ (%),
a value of $\theta_1$ divided by $H_1$ ($\theta_1/H_1$) is 500 or more but 1200 or less, and
a value of $\theta_2$ divided by $H_2$ ($\theta_2/H_2$) is 300 or more but 750 or less.

15. The manufacturing method according to claim 14 further comprising
(iii) heating the glass plate at a temperature that is higher than a glass-transition temperature of the glass ribbon but lower than a softening temperature of the glass ribbon.

16. The manufacturing method according to claim 14,
wherein at least one of the first film and the second film is consisting of a fluorine-doped tin oxide.

17. The manufacturing method according to claim 14, wherein, at the step (i), the first film, in which the film thickness $\theta_1$ is within a range from 300 nm to 550 nm, is formed, and or alternatively
wherein, at the step (ii), the second film, in which the film thickness $\theta_2$ is within a range from 250 nm to 550 nm, is formed.

18. The manufacturing method according to claim 14, wherein the step (i) includes
    forming a first undercoat layer; and
    forming the first film on the first undercoat layer.

19. The manufacturing method according to claim 14, wherein the step (ii) includes
    forming a second undercoat layer; and
    forming the second film on the second undercoat layer.

20. The manufacturing method according to claim 14, wherein at the step (i), the first film having a sheet resistance value of 20 $\Omega/\square$ or less is obtained, and/or
wherein at the step (ii), the second film having a sheet resistance value of 20 $\Omega/\square$ or less is obtained.

* * * * *